United States Patent
Shinoda et al.

(10) Patent No.: US 10,418,612 B2
(45) Date of Patent: Sep. 17, 2019

(54) SECONDARY BATTERY AND A METHOD OF MANUFACTURING SECONDARY BATTERY

(71) Applicant: Kabushiki Kaisha Toshiba, Minato-ku (JP)

(72) Inventors: Tatsuya Shinoda, Kashiwazaki (JP); Tatsuya Hashimoto, Kashiwazaki (JP); Koichi Kawamura, Fuchu (JP); Nobuyasu Negishi, Kashiwazaki (JP); Koichi Takeshita, Kashiwazaki (JP); Yasuaki Murashi, Kashiwazaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 243 days.

(21) Appl. No.: 15/218,111

(22) Filed: Jul. 25, 2016

(65) Prior Publication Data
US 2016/0336576 A1    Nov. 17, 2016

Related U.S. Application Data

(63) Continuation of application No. PCT/JP2015/052386, filed on Jan. 28, 2015.

(30) Foreign Application Priority Data

Jan. 29, 2014 (JP) ................................. 2014-014881

(51) Int. Cl.
| | | |
|---|---|---|
| *H01M 2/26* | (2006.01) | |
| *H01M 10/04* | (2006.01) | |
| *H01M 10/0525* | (2010.01) | |
| *H01M 10/0587* | (2010.01) | |
| *B23K 101/36* | (2006.01) | |
| *B23K 20/10* | (2006.01) | |

(52) U.S. Cl.
CPC ....... *H01M 2/263* (2013.01); *H01M 10/0431* (2013.01); *H01M 10/0525* (2013.01); *H01M 10/0587* (2013.01); *B23K 20/10* (2013.01); *B23K 2101/36* (2018.08); *H01M 2/26* (2013.01)

(58) Field of Classification Search
CPC .... H01M 2/26; H01M 2/263; H01M 10/0525; H01M 10/0587; H01M 10/431
See application file for complete search history.

(56) References Cited

U.S. PATENT DOCUMENTS

| | | | |
|---|---|---|---|
| 2005/0287429 A1 | 12/2005 | Cho et al. | |
| 2010/0005981 A1* | 1/2010 | Patrikios .................. | F16P 3/00 100/341 |
| 2010/0143773 A1* | 6/2010 | Honbou .............. | H01M 2/1077 429/94 |
| 2011/0052976 A1 | 3/2011 | Ishii et al. | |
| 2011/0223454 A1 | 9/2011 | Urano et al. | |
| 2012/0028107 A1* | 2/2012 | Sugita .................. | H01M 2/1022 429/156 |
| 2012/0164501 A1* | 6/2012 | Guen .................... | H01M 2/263 429/94 |
| 2013/0330593 A1 | 12/2013 | Kim et al. | |
| 2014/0030562 A1 | 1/2014 | Ishii et al. | |
| 2014/0120396 A1 | 5/2014 | Kajiwara | |
| 2014/0212718 A1 | 7/2014 | Yokoyama et al. | |
| 2014/0272490 A1* | 9/2014 | Han ..................... | H01M 10/658 429/61 |
| 2015/0214513 A1 | 7/2015 | Ishii et al. | |

FOREIGN PATENT DOCUMENTS

| | | |
|---|---|---|
| CN | 103081210 A | 5/2013 |
| CN | 103165850 A | 6/2013 |
| CN | 103490039 A | 1/2014 |
| JP | 2005-216825 | 8/2005 |
| JP | 2006-12836 | 1/2006 |
| JP | 2007-335150 | 12/2007 |
| JP | 2011-49065 | 3/2011 |
| JP | 2011-192517 | 9/2011 |
| JP | 2012-169064 | 9/2012 |
| JP | 2013-54998 | 3/2013 |
| JP | 2013-125657 | 6/2013 |
| KR | 10-2013-0069381 A | 6/2013 |
| WO | WO 2012/176704 A1 | 12/2012 |
| WO | WO 2013/031668 A1 | 3/2013 |

OTHER PUBLICATIONS

Machine translation of JP 2007-335150, published on Dec. 27, 2007 (Year: 2007).*
Merriam Webster's Collegiate Dictionary, Tenth Edition, 1997, p. 89 (Year: 1997).*
Written Opinion dated Mar. 31, 2015 in PCT/JP2015/052386, filed on Jan. 28, 2015.
Extended European Search Report dated May 29, 2017 in Patent Application No. 15742804.6.

* cited by examiner

*Primary Examiner* — Anca Eoff

(74) *Attorney, Agent, or Firm* — Oblon, McClelland, Maier & Neustadt, L.L.P.

(57) ABSTRACT

A secondary battery according to one embodiment includes, an electrode group which is a cathode and an anode wound with a separator being interposed therebetween, a first lead having a first welding surface, a second lead having a second welding surface which is bent with respect to a winding axial direction of the electrode group, a first current collecting tab which is extended from one end of the electrode group on the winding axial direction, and welded onto the first welding surface of the first lead, a second current collecting tab which is extended from the other end of the electrode group on the winding axial direction, and welded onto the second welding surface of the second lead, a first terminal connected to the first lead, and a second terminal connected to the second lead.

8 Claims, 4 Drawing Sheets

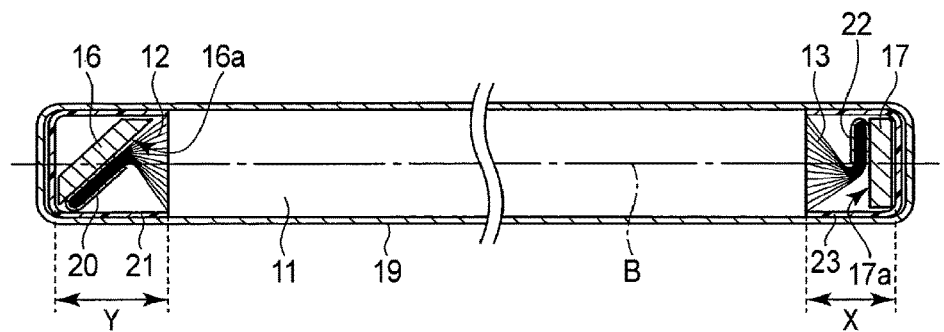
F I G. 3
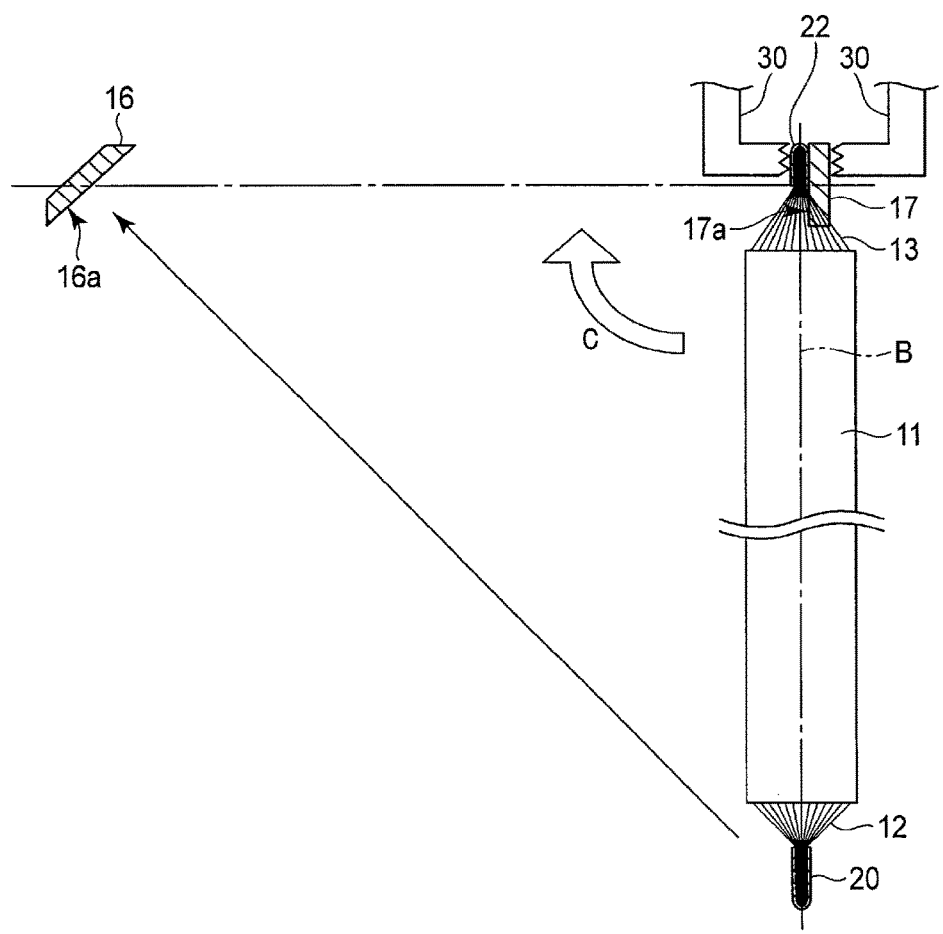
F I G. 4

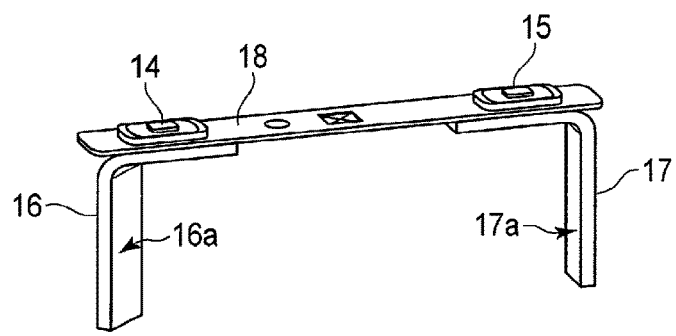
F I G. 5
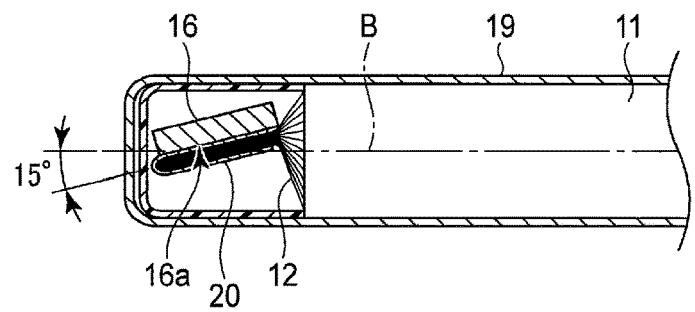
F I G. 6
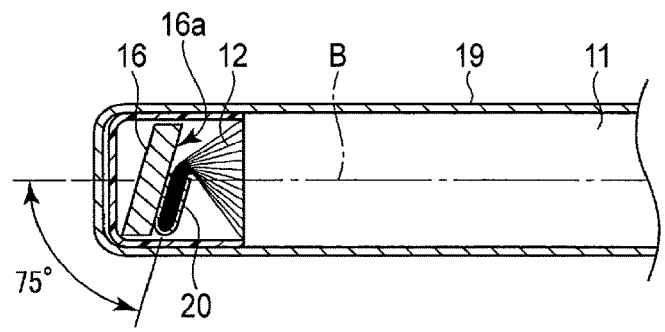
F I G. 7A

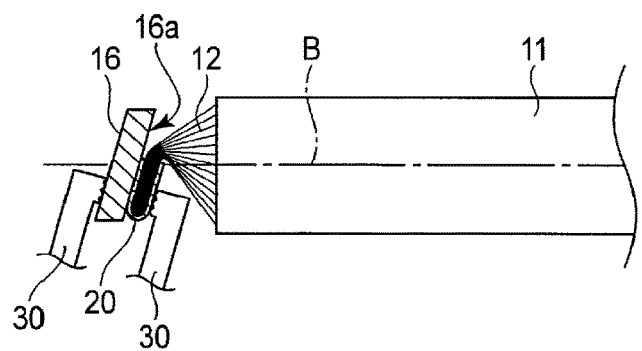
F I G. 7B
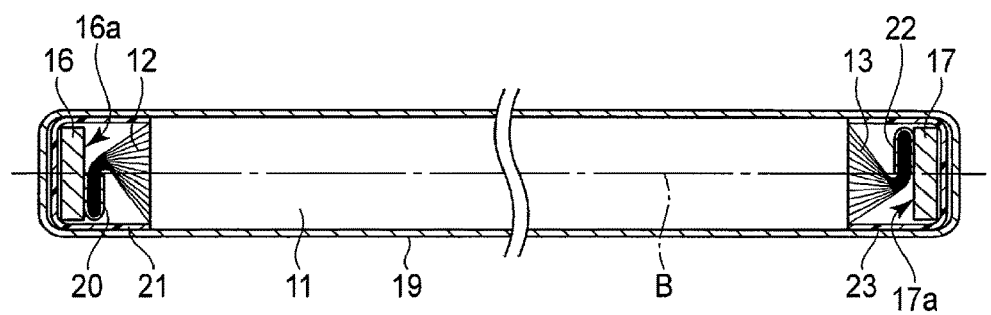
F I G. 8
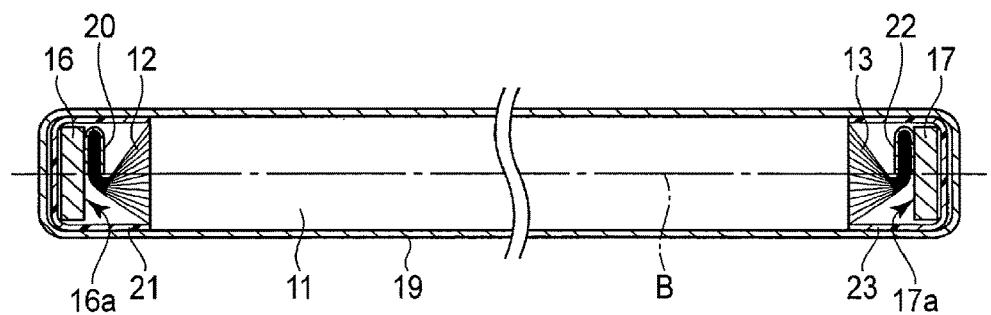
F I G. 9

SECONDARY BATTERY AND A METHOD OF MANUFACTURING SECONDARY BATTERY

CROSS-REFERENCE TO RELATED APPLICATIONS

This is a continuation application of PCT Application No. PCT/JP2015/052386, filed Jan. 28, 2015, which was published under PCT Article 21(2) in Japanese.

This application is based upon and claims the benefit of priority from Japanese Patent Application No. 2014-014881, filed Jan. 29, 2014, the entire contents of which are incorporated herein by reference.

FIELD

The embodiment of the present invention relates to a secondary battery and a method of manufacturing a secondary battery.

BACKGROUND

In recent years, a lithium ion battery, etc. is widely used as a secondary battery. High-energy density and high durability are required for a secondary battery, depending on the field of application. For example, a lithium ion battery comprises an electrode assembly (electrode group) in which a lamination of a cathode and an anode is wound with a separator being interposed therebetween. The lithium ion secondary battery comprises a configuration in which an electrode assembly is sealed in a battery can (outer can) filled with an organic electrolyte.

To increase the capacity of the secondary battery, it is important to secure a maximum space for the electrode group. To make the secondary battery capable of high-power, it is important to secure a maximum cross-section area of conductive paths, such as leads, etc., and to inhibit heat generation by reducing the resistance of conductive paths. Thus, the configuration for increasing the capacity of the secondary battery and the configuration for making the secondary battery capable of high-power is a tradeoff between a maximum space for the electrode group and a largest cross-section area of conductive paths.

A common method of assembling a secondary battery is a method by which terminals and leads, etc. are first fixed to the caps, and then the caps to which the terminal and leads, etc. are fixed are connected to the electrode group, and there are constraints on the assembly process, as well as the aforementioned tradeoff.

To solve the problem, a secondary battery and a method of manufacturing a second battery that allows an increase in capacity to be compatible with a high-power battery are provided.

BRIEF DESCRIPTION OF THE DRAWINGS

FIG. 3 is a drawing to explain a secondary battery according to one embodiment.

FIG. 4 is a drawing to explain a method of manufacturing a secondary battery according to one embodiment.

FIG. 5 is a drawing to explain a secondary battery according to one embodiment.

FIG. 6 is a drawing to explain a secondary battery according to one embodiment.

FIG. 7A is a drawing to explain a secondary battery according to one embodiment.

FIG. 7B is a drawing to explain a secondary battery according to one embodiment.

FIG. 8 is a drawing to explain a secondary battery according to one embodiment.

FIG. 9 is a drawing to explain a secondary battery according to one embodiment.

DETAILED DESCRIPTION

Hereinafter, it is explained with reference to the drawings.

Figure 1:
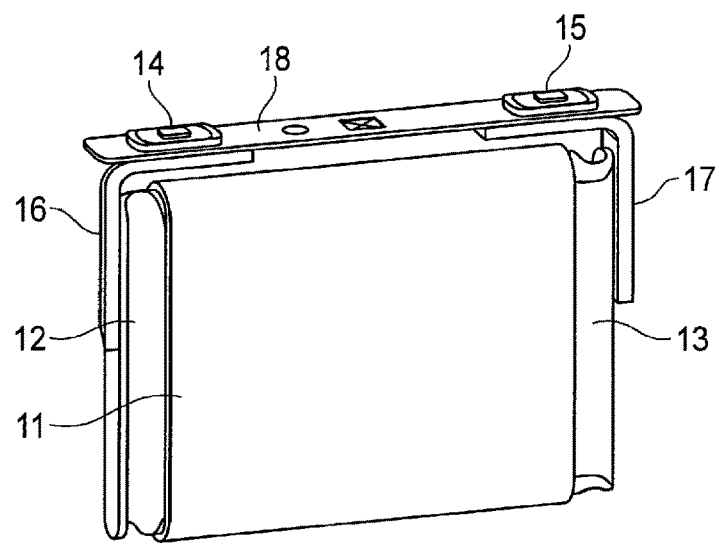
FIG. 1 is a drawing to explain a secondary battery according to one embodiment.
Figure 2:
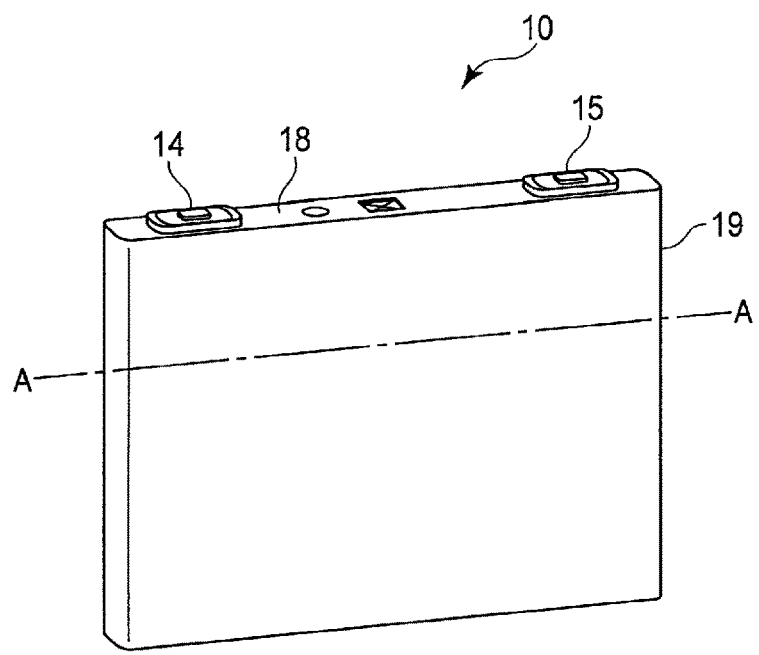
FIG. 2 is a drawing to explain a secondary battery according to one embodiment.

FIGS. 1 and 2 show an example of a secondary battery 10 according to one embodiment. FIG. 1 shows an example of an internal configuration of the battery 10. FIG. 2 shows an example of an exterior of the secondary battery 10.

As shown in FIG. 1, the secondary battery 10 comprises an outer can 19, an electrode group 11 stored in the outer can 19, a cathode current collecting tab 12, an anode current collecting tab 13, a cathode terminal 14, an anode terminal 15, a cathode lead 16, an anode lead 17, and a cap 18. An electrolyte is retained at the electrode group 11. The electrolyte is, for example, a nonaqueous electrolyte.

The outer can 19 may be formed of aluminum or an aluminum alloy, etc., for example. An aluminum alloy containing an element, such as magnesium, zinc, or silicon, is preferable. If a transition metal, such as iron, copper, nickel, or chromium, etc. is contained in the alloy, it is preferable to limit the amount of such transition metal to 100 ppm or less. The plate thickness of the exterior container can be thinner than 1 mm, preferably thinner than 0.5 mm.

The electrode group 11 is a cathode and an anode wound into a flat shape, with a separator being interposed therebetween. The cathode includes a band-shaped cathode current collector made of, for example, a metallic foil, a cathode current collecting tab 12 consisting of one edge portion parallel to the long side of the cathode current collector, and a cathode material layer (a layer containing a cathode active material) formed in the cathode current collector except for at least the cathode current collecting tab 12. On the other hand, an anode includes a band-shaped anode made of, for example, a metallic foil, an anode current collecting tab 13 consisting of one edge portion parallel to the long side of the anode current collector, and an anode material layer (a layer containing an anode active material) formed in the anode current collector except for at least the anode current collecting tab 13.

Such a cathode, a separator, and an anode are wound with the locations of the cathodes and anodes being displaced in such a manner that the cathode current collecting tab 12 is projected from the separator in the winding axial direction, and the anode current collecting tab 13 is projected from the separator in a direction opposite to the winding axial direction. Because of such winding, in the electrode group 11, the spirally-wound cathode current collecting tab 12 is projected from one of the edge surface, and the spirally-wound anode current collecting tab 13 is projected from the other edge surface.

The current collecting tabs of the cathodes and anodes may be made of the same material as the material for the current collectors of the cathode and anode, and may be formed of an aluminum alloy containing at least one element selected from a group of Al, Mg, Ti, Zn, Mn, Fe, Cu, and Si.

The cathode end 14 is electrically connected to the cathode current collecting tab 12 with the cathode lead 16 being interposed therein. The anode end 15 is electrically connected to the anode current collecting tab 13 with the anode lead 17 being interposed therein. For the cathode terminal 14 and the anode terminal 15, an aluminum alloy including at least one element selected from a group of Al, Mg, Ti, Zn, Mn, Fe, Cu, and Si, for example, may be used.

Each of the cathode lead 16 and the anode lead 17 is formed of band-shaped conductive plates. The cathode lead 16 is electrically connected to the cathode current collecting tab 12, and the anode lead 17 is electrically connected to the anode current collecting tab 13. Each of the cathode terminal 14 and the anode terminal 15 are fixed to the cap 18 with an insulating member being interposed therebetween. The distal end of the cathode lead 16 is electrically connected to the cathode terminal 14. The distal end of the anode lead 17 is electrically connected to the anode terminal 15.

The cap 18 is a plate that covers the upper surface of the outer can 19. The cap 18 may be made of aluminum or an aluminum alloy, etc., for example. The cap 18 comprises a hole for passing the cathode terminal 14 and a hole for passing the anode terminal 15. The cap 18 fixes the cathode terminal 14 and the anode terminal 15 with an insulating member, which is arranged at the holes, being interposed therebetween. The cap 18 also fixes the cathode lead 16 and the anode lead 17 with an insulating material (not shown) being interposed therebetween.

It should be noted that the cathode lead 16 is fixed to the cap 18 by riveting the cathode terminal 14. The cathode 16 is fixed to the cathode current collecting tab 12 of the electrode group 11 by ultrasonic welding. The anode lead 17 is fixed to the cap 18 by riveting the anode terminal 15. The anode 17 is fixed to the anode current collecting tab 13 of the electrode group 11 by ultrasonic welding.

The secondary battery 10 comprises the electrode group 11, the cathode current collecting tab 12, the anode current collecting tab 13, the cathode terminal 14, the anode terminal 15, the cathode lead 16, and the anode lead 17, as shown in FIG. 1, in the outer can 19. The cap 18 is fixed to the outer can 19, and the secondary battery 10 is in a usable condition.

Herein, materials for the cathode and anode terminals that can be used in one embodiment are explained. In the case of a lithium ion secondary battery using carbon material as an anode active substance, aluminum or an aluminum alloy is generally used for the cathode terminal, and a metal, such as copper, nickel, and nickel-plated iron, is generally used for the anode terminal. In a case of using titan-oxide lithium as an anode active substance, aluminum or an aluminum alloy may be used for the anode terminal, in addition to the above metals. In a case of using aluminum or an aluminum alloy for the cathode and anode terminals, the cathode and anode current collecting tabs, the cathode and anode holding members, and the cathode and anode leads are formed of preferably aluminum or an aluminum alloy.

Next, a cathode, an anode, a separator, and an electrolyte that can be used for a battery according to an embodiment are described.

The cathode is manufactured by coating a current collector consisting of an aluminum foil or an aluminum alloy foil with slurry including a cathode active substance, for example. As the cathode active substance, an oxide or a sulfide that can occlude and discharge lithium, a polymer, etc., may be used, but is not limited thereto. A lithium manganese composite oxide, a lithium nickel composite oxide, a lithium cobalt composite oxide, and a lithium iron phosphate, etc. are listed as a preferable active substance. The anode is manufactured by coating a current collector consisting of an aluminum foil or an aluminum alloy foil with slurry including a cathode active substance. As the anode active substance, a metal oxide, a metal sulfide, a metal nitride, and an alloy, etc. that can occlude and discharge lithium can be used but is not limited thereto, and preferably is a substance which occludes and discharges lithium ions at the noble potential of 0.4 V or more in comparison to a potential of metal lithium. An anode active substance having such a potential at which lithium ions are occluded and discharged can inhibit an alloy reaction between aluminum and lithium or an aluminum alloy and lithium; thus, aluminum or an aluminum alloy can be used for an anode current collector and anode-related constituent members. For example, a titanium oxide, a lithium titanium composite oxide such as lithium titanate, a tungsten oxide, an amorphous tin oxide, a tin silicon oxidate, a silicon oxide, or preferably a lithium titanium composite oxide are preferable. For a separator, a microporous film, a woven fabric, and an unwoven fabric, or a lamination of different materials or the same material are preferable. As a material to form a separator, polyethylene, polypropylene, ethylene-propylene copolymer, ethylene-butene copolymer, etc. may be used.

As an electrolyte, a nonaqueous electrolyte prepared by dissolving an electrolyte (e.g., a lithium salt) in a nonaqueous solvent may be used. As a nonaqueous solvent, ethylene carbonate (EC), propylene carbonate (PC), buthylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxy-ethan, 1,3-dimethoxy propane, dimethyl ethel, tetrahydrofuran (THF), 2-methyltetrahydrofuran, etc. may be used. A nonaqueous solvent may be used singly, or two or more nonaqueous solvents may be mixed. As an electrolyte, lithium salts, for example, perchlorate lithium ($LiClO_4$), hexafluorophosphate lithium ($LiPF_6$), tetrafluoroborate lithium ($LiBF_4$), hexafluoro lithium ($LiAsF_6$), trifluoro methan sulfonate lithium ($LiCF_3SO_3$), etc., may be used. An electrolyte may be used singly, or two or more electrolytes may be mixed. An amount of dissolved electrolyte to a nonaqueous solvent is desirably in the range between 0.2 mol/L and 3 mol/L.

FIG. 3 shows an example of a cross section when the secondary battery 10 is cut on the line AA indicated in FIG. 2.

As described above, the electrode group 11 is a cathode and an anode wound into a flat shape, with a separator being interposed therebetween. The direction of the winding axis (the winding axial direction) is referred to as B. In this case, the secondary battery has a space X and a space Y on the end portions of the outer can 19 in the winding axial direction B. The space X and Y are the space for connecting the cathode lead 16 and the anode lead 17 with the cathode current collecting tab 12 and the anode current collecting tab 13. The smaller the space becomes, the further the size of the electrode group 11 can be increased. In other words, the capacity of the secondary battery 10 can be increased by reducing the space for connecting a current collecting tab with an electrode lead.

The electrode group 11, in which the cathode and the anode are wound with a separator being interposed therebetween, comprises the cathode current collecting tab 12 extended from one end of the electrode group 11 on the winding axial direction B and the anode current collecting tab extended from the other end of the electrode group 11 on the winding axial direction B. The cathode terminal 14, the anode terminal 15, the cathode lead 16, and the anode lead 17 are fixed at the cap 18. By electrically connecting the cathode current collecting tab 12 with the cathode lead 16 and electrically connecting the anode current collecting tab 12 with the anode lead 16, the secondary battery 10 may be in a chargeable and dischargeable condition.

According to the example illustrated in FIG. 3, the cathode lead 16 comprises a welding surface 16a. The welding surface 16a is a surface defining a certain angle with respect to the winding axial direction B of the electrode group 11 when the secondary battery 10 is assembled. In other words, the welding surface 16a is a surface bent with respect to the winding axial direction B of the electrode group 11 when the secondary battery 10 is assembled. The anode lead 17 comprises a welding surface 17a. The welding surface 17a is a surface orthogonal to the winding axial direction B of the electrode group 11 when the secondary battery 10 is assembled.

The cathode current collecting tab 12 is binded to a tab holding member 20 which has a conductive characteristic, and is welded to the welding surface 16a of the cathode lead 16 by ultrasonic welding. The anode current collecting tab 13 is binded to a tab holding member 22 which has a conductive characteristic, and is welded to the welding surface 17a of the anode lead 17 by ultrasonic welding.

By welding the tab to the lead, the electrode group 11, the cathode current collecting tab 12, the anode current collecting tab 13, the cathode terminal 14, the anode terminal 15, the cathode lead 16, the anode lead 17, and the cap 18 are integrated. Furthermore, those elements are sealed in the outer can 19, and the cap 18 is fixed to the outer can 19; thus, the secondary battery 10 comes to be in a usable condition.

It should be noted that an insulating member 21 and an insulating member 23 are provided on the inner wall of the outer can 19 to prevent the cathode current collecting tab 12, the anode current collecting tab 13, the cathode lead 16, and the anode lead 17 from being electrically connected to the inner wall of the outer can 19 when the electrode group 11, etc. is sealed in the outer can 19. The insulating member 21 is provided on the inner wall of the outer can 19, which is opposite to the cathode current collecting tab 12 and the cathode lead 16, to prevent the cathode current collecting tab 12 and the cathode lead 16 from being electrically connected to the inner wall of the outer can 19. The insulating member 23 is provided on the inner wall of the outer can 19 which is opposite to the anode current collecting tab 13 and the anode lead 17 to prevent the anode current collecting tab 13 and the anode lead 17 from being electrically connected to the inner wall of the outer can 19.

The manufacturing process is described with reference to FIGS. 4 and 5.

FIG. 5 shows the cathode terminal 14, the anode terminal 15, the cathode lead 16, and the anode lead 17 being fixed to the cap 18 by caulking. As described above, the welding surface 16a of the cathode lead 16 is provided so as to be bent with respect to the winding axial direction B of the electrode group 11 when the secondary battery 10 is assembled. The welding surface 16a of the cathode lead 16 is provided so as to be orthogonal to the winding axial direction B of the electrode group 11 when the secondary battery 10 is assembled.

FIG. 4 shows an example of the process of manufacturing the secondary battery 10. FIG. 4 shows an example of procedures for welding the cathode current collecting tab 12 to the cathode lead 16, and for welding the anode current collecting tab 13 to the anode lead 17. The tab and the lead are welded by being held by the processing head 30 for ultrasonic welding and being pressed while receiving ultrasonic vibration.

First, the anode current collecting tab 13 is ultrasonically welded to the welding surface 17a of the anode lead 17 which is fixed to the anode terminal 15 and the cap 18. In this case, the processing head 30 for the ultrasonic welding holds the anode current collecting tab 13, the tab holding member 22, and the anode lead 17 while the tab holding member 22 for holding the anode current collecting tab 13 is being fixed to the welding surface 17a of the anode lead 17, and applies ultrasonic vibration and pressure to weld the anode current collecting tab 13 to the welding surface 17a of the anode lead 17. Thus, the anode current collecting tab 13 and the anode lead 17 are electrically connected to each other.

Next, the cathode current collecting tab 12 is ultrasonically welded to the welding surface 16a of the cathode lead 16 which is fixed to the cathode terminal 14 and the cap 18. In this case, since the anode current collecting tab 13 and the anode lead 17 are welded together, the cathode current collecting tab 12 and the electrode group 11 are folded over in the direction indicated by arrow C in FIG. 4. Thus, the cathode current collecting tab 12 which is held by the tab holding member 20 is in contact with the welding surface 16a side of the cathode lead 16. The processing head 30 for the ultrasonic welding holds the cathode current collecting tab 12, the tab holding member 20, and the cathode lead 16 while tab holding member 20 for holding the cathode current collecting tab 12 is being fixed to the welding surface 16a of the cathode lead 16, and applies ultrasonic vibration and a pressure to weld the cathode current collecting tab 13 to the welding surface 17a of the cathode lead 16. Thus, the cathode current collecting tab 12 and the cathode lead 16 are electrically connected to each other.

According to the above-described configuration, the secondary battery 10 comprises the cathode lead 16 having the welding surface 16a bent with respect to the winding axial direction B of the electrode group 11, and the anode lead 17 having the welding surface 17a orthogonal to the winding axial direction B of the electrode group 11. Thus, the cathode 16 and the anode lead 17 are provided in such a manner that the space X and the space Y in the winding axial direction B of the electrode group 11 can be omitted. For this reason, in the secondary battery 10, it is possible to secure a maximum cross section of conductive paths and a maximum space for the electrode group 11. As a result, a secondary battery with an increased capacity and high power, and a method of manufacturing the same can be provided.

The welding surface 16a is arranged so as to define a certain angle with respect to the winding axial direction B of the electrode group 11 when the secondary battery 10 is assembled. For this reason, there is a possibility that a processing head for ultrasonic welding may be in contact with the electrode group 11 or the cathode current collecting tab 12, depending on an angle of the welding surface 16a. For this reason, there are certain conditions for the angle of the welding surface 16a with respect to the winding axial direction B of the electrode group 11.

FIG. 6 shows an example of the angle of the welding surface 16a. In this example, the welding surface 16a is provided so as to define an angle of 15 degrees with respect to the winding axial direction B of the electrode group 11. In this case, there will be sufficient space for holding the tab holding member 20 which holds the cathode current collecting tab 12 and the cathode lead 16 by the processing head 30 for ultrasonic welding. For this reason, in the secondary battery 10, it is possible to secure a maximum cross section of conductive paths and a maximum space for the electrode group 11.

If the angle of the welding surface 16a with respect to the winding axial direction B of the electrode group 11 is narrower than 15 degrees, an expansion of the space for the electrode group 11 cannot be expected. For this reason, the angle of the welding surface 16a with respect to the winding axial direction B of the electrode group 11 is desirably equal to or greater than 15 degrees.

FIG. 7 shows another example of the angle of the welding surface 16a. FIG. 7 shows another example of the angle of the welding surface 16a in the secondary battery 10. FIG. 7B shows an example of an arrangement in which the cathode current collecting tab 12 and the cathode lead 16 are held by the processing head 30 for ultrasonic welding.

In this example, the welding surface 16a is arranged so as to define an angle of 75 degrees with respect to the winding axial direction B of the electrode group 11. In this case, there will be a bare minimum space for holding the tab holding member 20 which holds the cathode current collecting tab 12 and the cathode lead 16 by the processing head 30 for ultrasonic welding. For this reason, in the secondary battery 10, it is possible to secure a maximum cross section of conductive paths and to secure a maximum space for the electrode group 11.

It should be noted that the processing head 30 for ultrasonic welding will be in contact with the electrode group 11 or the cathode current collecting tab 12 if the angle of the welding surface 16a with respect to the winding axial direction B of the electrode group 11 is larger than 75 degrees. For this reason, the angle of the welding surface 16a with respect to the winding axial direction B of the electrode group 11 is desirably equal to or less than 75 degrees.

Furthermore, more space for the electrode group 11 can be secured when the angle of the welding surface 16a with respect to the winding axial direction B of the electrode group 11 is 75 degrees, in comparison to the case when the angle is 15 degrees. For this reason, it is desirable for the angle of the welding surface 16a with respect to the winding axial direction B of the electrode group 11 to be as large as possible within the range where the processing head 30 for ultrasonic welding does not touch the electrode group 11 or the cathode current collecting tab 12.

In the above-described embodiment, it was explained that the welding surface 17a of the anode 17 is a surface orthogonal to the winding axial direction B of the electrode group 11, and the welding surface 16a of the cathode 16 is a surface bent with respect to the winding axial direction B of the electrode group 11; however, the embodiment is not limited to this configuration. The welding surface 16a of the cathode 16 may be a surface orthogonal to the winding axial direction B of the electrode group 11, and the welding surface 17a of the anode 17 may be a surface bent with respect to the winding axial direction B of the electrode group 11. In other words, the cathode and the anode may be inverted.

Furthermore, it was explained that the lead and the tab are welded together in the above-described embodiment; however, the embodiment is not limited to this technique. The connection between the lead and the tab can be achieved by any technique, as long as the connection is an electrical connection and the maximum cross-section areas of conductive paths can be secured. The present invention is effective for manufacturing methods of connecting welding targets by holding, such as for ultrasonic welding, electric resistance welding, and friction-stir joining, etc.

In the above-described embodiment, it was explained that the angle of the welding surface 16a with respect to the winding axial direction B of the electrode group 11 is desirably between 15 degrees and 75 degrees; however, the embodiment is not limited to this configuration. The conditions for this angle are determined by the size of the processing head 30 for ultrasonic welding, and the angle may be any angle as long as holding by the processing head 30 is possible for ultrasonic welding.

For example, as shown in FIG. 8, the welding surface 16a is arranged so as to define an angle of 90 degrees with respect to the winding axial direction B of the electrode group 11. In other words, the welding surface 16a may be a surface orthogonal to the winding axial direction B of the electrode group 11, like the welding surface 17a. In this case, in the secondary battery 10, it is possible to secure a maximum cross section of conductive paths and a maximum space for the electrode group 11.

In the above embodiment, it was explained that the electrode group 11 is folded over so that the cathode current collecting tab 12 and the cathode lead 16 are welded together after welding the anode current collecting tab 13 and the anode lead 17 are welded together; however, the embodiment is not limited to this procedure. For example, the cathode lead 16 and the anode lead 17 may be mounted so as to overlap the cathode current collecting tab 12 and the anode current collecting tab 13 when welding. In this case, the cathode current collecting tab 12 and the anode current collecting tab 13 are bent in the same direction and welded onto the cathode lead 16 and the anode 17, respectively. Even with such a configuration, in the secondary battery 10, it is possible to secure a maximum cross section of conductive paths and a maximum space for the electrode group 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
an outer can;
a cap which covers an upper surface of the outer can;
an electrode group which is a cathode and an anode wound with a separator being interposed therebetween, and which is stored in the outer can, the electrode group and the outer can forming a first space and a second space on end portions of the outer can in a winding axial direction;
a first lead having a first welding surface and having a band shape, the first welding surface being disposed in the first space and forming one of two planes of the first lead having the band shape;
a second lead having a band shape and having a second welding surface which is bent with respect to the winding axial direction of the electrode group, the second welding surface being disposed in the second space and forming one of two planes of the second lead having the band shape;
a first current collecting tab which is extended from one end of the electrode group on the winding axial direction, and welded onto only the first welding surface of the first lead in the first space;
a second current collecting tab which is extended from the other end of the electrode group on the winding axial direction, and welded onto only the second welding surface of the second lead in the second space;
a first terminal fixed to the cap and connected to the first lead;
a second terminal fixed to the cap and connected to the second lead;
a first insulating member which is provided on an inner wall of the outer can in the first space, the first insulating member preventing the first lead and the first current collecting tab from being electrically connected to the inner wall of the outer can in the first space; and
a second insulating member which is provided on the inner wall of the outer can in the second space, the second insulating member preventing the second lead and the second current collecting tab from being electrically connected to the inner wall of the outer can in the second space,
wherein the second welding surface of the second lead is a surface bent at an angle between 15 degrees and 75 degrees with respect to the winding axial direction of the electrode group.

2. The secondary battery according to claim 1, wherein the first welding surface of the first lead is a surface orthogonal to the winding axial direction of the electrode group.

3. The secondary battery according to claim 1, wherein the first current collecting tab consists of one edge portion parallel to a long side of the cathode of the electrode group, and is bound at a one position in the first space, and
the second current collecting tab consists of one edge portion parallel to a long side of the anode of the electrode group, and is bound at a one position in the second space.

4. The secondary battery according to claim 1, wherein the first lead is in contact with the first insulating member in the first space, and
the second lead is in contact with the second insulating member in the second space.

5. The secondary battery according to claim 1, wherein only one electrode group is stored in the outer can.

6. The secondary battery according to claim 1, wherein the winding axial direction of the electrode group is orthogonal to an opening direction of the outer can.

7. A method of manufacturing a secondary battery comprising an electrode group in which a cathode and an anode are wound with a separator being interposed therebetween, a first current collecting tab extended from one end of the electrode group on a winding axial direction, a second current collecting tab extended from the other end of the electrode group on the winding axial direction, a first lead, a second lead, a first terminal connected to the first lead, and a second terminal connected to the second lead, the method comprising:
welding the first current collecting tab onto a first welding surface;
folding the electrode group and the second current collecting tab over relative to the first current collecting tab in a state in which the first current collecting tab is welded onto the first welding surface so as to bring the first welding surface being orthogonal to the winding axial direction of the electrode group and bring the second current collecting tab into contact with the second lead; and
welding the second current collecting tab onto a second welding surface which is bent with respect to the winding axial direction of the electrode group of the second lead.

8. The method of manufacturing a secondary battery according to claim 7, wherein a processing head for ultrasonic welding holds the first current collecting tab and the first lead and applies ultrasonic vibration and a pressure to the first current collecting tab and the first lead in order to weld the first current collecting tab onto the first welding surface, and the processing head for ultrasonic welding holds the second current collecting tab and the second lead and applies ultrasonic vibration and a pressure to the second current collecting tab and the second lead in order to weld the second current collecting tab onto the second welding surface.

* * * * *